(12) United States Patent
Chang

(10) Patent No.: US 8,850,093 B2
(45) Date of Patent: Sep. 30, 2014

(54) MOUSE WITH A REPLACEABLE SENSING UNIT

(71) Applicant: Dexin Corporation, New Taipei (TW)

(72) Inventor: Yuan-Jung Chang, New Taipei (TW)

(73) Assignee: Dexin Corporation, New Taipei (TW)

( * ) Notice: Subject to any disclaimer, the term of this patent is extended or adjusted under 35 U.S.C. 154(b) by 0 days.

(21) Appl. No.: 13/892,244

(22) Filed: May 11, 2013

(65) Prior Publication Data

US 2014/0215105 A1    Jul. 31, 2014

(30) Foreign Application Priority Data

Jan. 25, 2013   (TW) .............................. 102102918 U

(51) Int. Cl.
*G06F 13/00*    (2006.01)
*G06F 3/0354*   (2013.01)

(52) U.S. Cl.
CPC .................................. *G06F 3/03543* (2013.01)
USPC .............................................. 710/73; 710/63

(58) Field of Classification Search
None
See application file for complete search history.

(56) References Cited

U.S. PATENT DOCUMENTS 6,801,967 B2 * 10/2004 Nakamura et al. .............. 710/62

* cited by examiner

*Primary Examiner* — Cheng-Yuan Tseng
(74) *Attorney, Agent, or Firm* — Li&Cai Intellectual Property (USA) Office

(57) ABSTRACT

A mouse with a replaceable sensing unit comprises a main body, a processor unit and a sensing unit. The main body has a containing slot and a first electrical interface. The first electrical interface is disposed in the containing slot. The processor unit is disposed in the main body, and coupled to the first electrical interface. The sensing unit is replaceably disposed in the containing slot of the main body, and the sensing unit is coupled to the first electrical interface when the sensing unit is disposed in the containing slot. The processor unit gets via the first electrical interface an input signal generated when the sensing unit senses the movement of the main body, and then relatively outputs a cursor control signal to a computer apparatus.

11 Claims, 6 Drawing Sheets

MOUSE WITH A REPLACEABLE SENSING UNIT

BACKGROUND OF THE INVENTION

1. Field of the Invention

The present invention relates to a mouse; in particular, to a mouse with a replaceable sensing unit.

2. Description of Related Art

The life of current people is closely related with computer apparatuses, wherein a mouse has become a necessary peripheral outfit of a computer apparatus. Similar to a keyboard, a mouse lets a user easily perform operation and execution of a computer program. However, a mouse is usually operated on various working surface, for example, a mouse pad surface of different pigment coating layers, a plastic surface, a glassy surface or a woody surface. Therefore, the sensing unit of a mouse is possibly unsuitable to operate on a specific working surface, for example, a mouse with an infrared sensing unit is unsuitable to operate on a transparent glassy surface. Hence, when a mouse is operated on an unsuitable working surface, it will be caused that a cursor control signal moving abnormally is transmitted to a computer apparatus, so that operation inconvenience of a mouse is resulted.

SUMMARY OF THE INVENTION

The object of the present invention is to provide a mouse with a replaceable sensing unit, so as to solve the above problem.

The present invention provides a mouse that comprises a main body, a processor unit and a sensing unit. The main body has a containing slot and a first electrical interface. The first electrical interface is disposed in the containing slot. The processor unit is disposed in the main body, and coupled to the first electrical interface. The sensing unit is replaceably disposed in the containing slot of the main body, and the sensing unit is coupled to the first electrical interface when the sensing unit is disposed in the containing slot. The processor unit gets via the first electrical interface an input signal generated when the sensing unit senses the movement of the main body, and then relatively outputs a cursor control signal to a computer apparatus.

The present invention provides a mouse that comprises a main body, a processor unit, a sensing unit and a setting unit. The main body has a containing slot and several first electrical interfaces. These first electrical interfaces are disposed in the containing slot. The processor unit is disposed in the main body, and coupled to these first electrical interfaces. The sensing unit is replaceably disposed in the containing slot of the main body, the sensing unit has several sensing elements and several second electrical interfaces, and each sensing element is respectively connected to a second electrical interface. Each first electrical interface is respectively connected to a second electrical interface when the sensing unit is disposed in the containing slot. The setting unit is coupled to the processor unit and sets one of said first electrical interfaces to perform signal transmission with the processor unit. According to setting result of the setting unit, the processor unit gets correspondingly via the set first electrical interface an input signal generated when the sensing unit senses the movement of the main body, and then relatively outputs a cursor control signal to a computer apparatus.

Summing up the above, as for the mouse with a replaceable sensing unit in the present invention, the sensing unit can be replaceably disposed in the containing slot of the mouse, so that the processor unit gets via the first electrical interface an input signal generated when the sensing unit senses the movement of the main body, and then relatively outputs a cursor control signal to a computer apparatus, hence the operation convenience of the mouse is enhanced.

In order to further the understanding regarding the present invention, the following embodiments are provided along with illustrations to facilitate the disclosure of the present invention. However, the description and drawings are merely provided for reference and illustration, without any intention to be used for limiting the present invention.

DETAILED DESCRIPTION OF THE PREFERRED EMBODIMENTS

The aforementioned illustrations and following detailed descriptions are exemplary for the purpose of further explaining the scope of the present invention. Other objects and advantages related to the present invention will be illustrated in the subsequent descriptions and appended drawings.

Figure 1A:
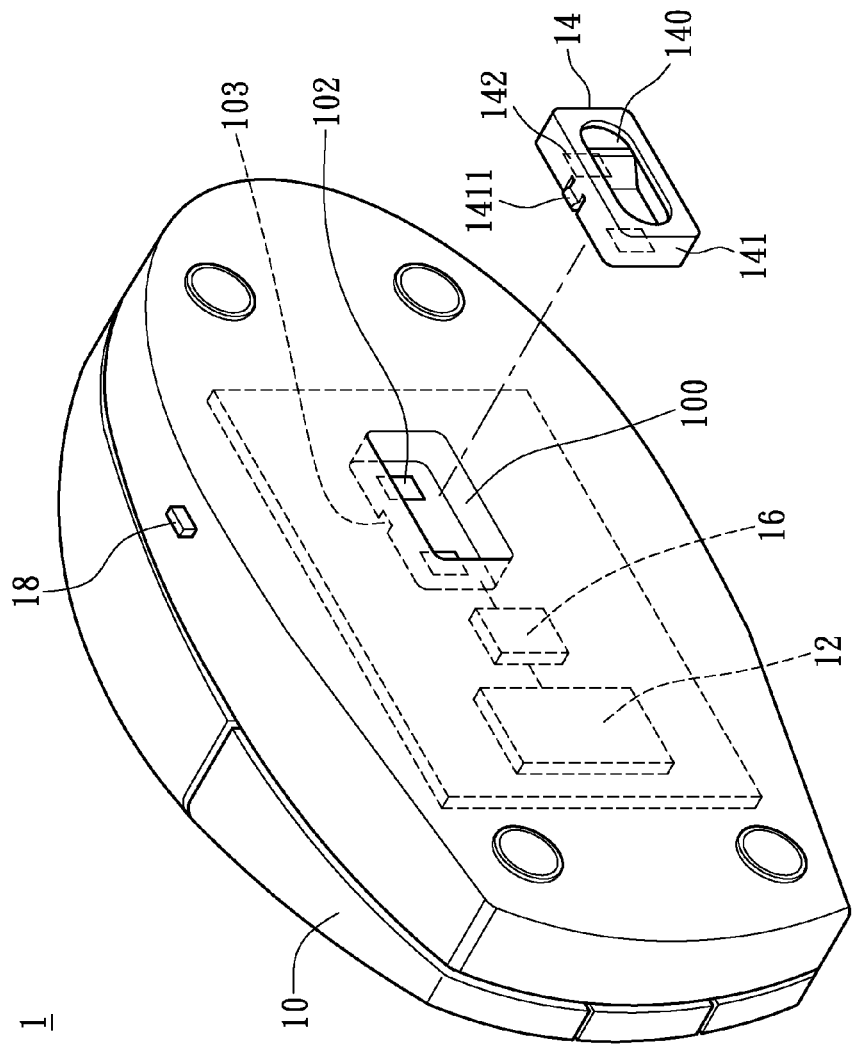
FIG. 1A shows a schematic diagram of a mouse with a replaceable sensing unit according to an embodiment of the present invention.
Figure 1B:
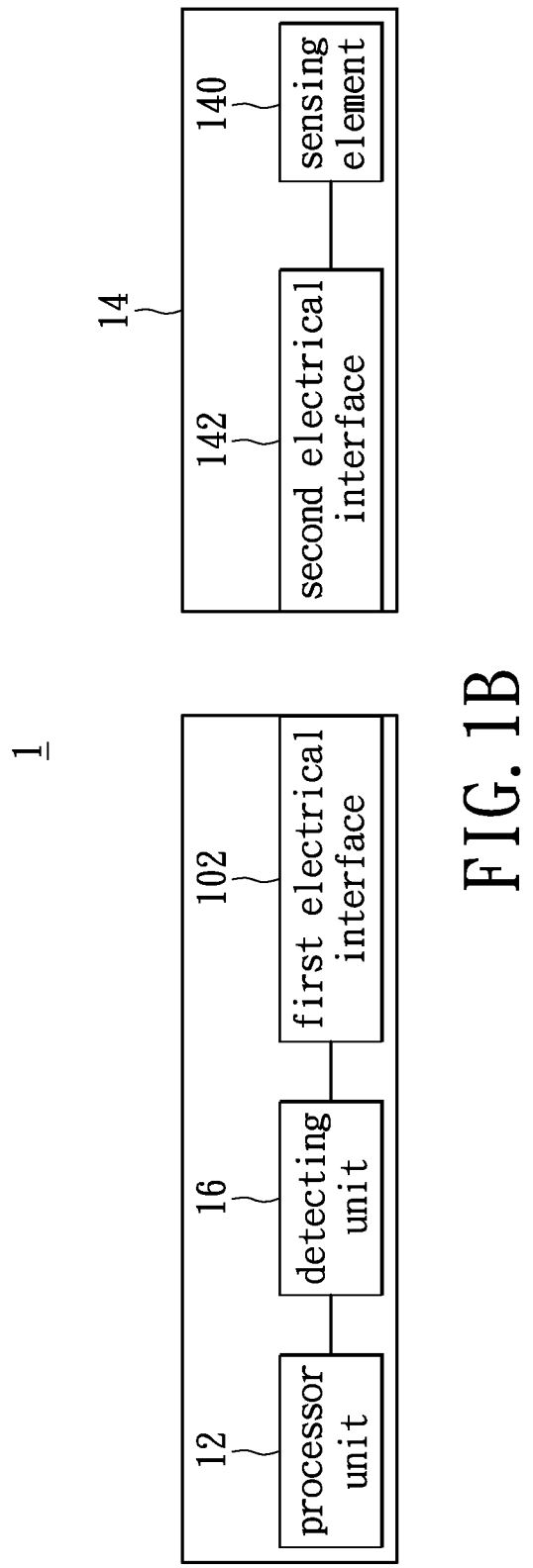
FIG. 1B shows a functional block diagram of a mouse with a replaceable sensing unit according to the embodiment of FIG. 1A in the present invention.

FIG. 1A shows a schematic diagram of a mouse with a replaceable sensing unit according to an embodiment of the present invention. FIG. 1B shows a functional block diagram of a mouse with a replaceable sensing unit according to the embodiment of FIG. 1A in the present invention. Please refer to FIG. 1A and FIG. 1B. A mouse 1 with a replaceable sensing unit comprises a main body 10, a processor unit 12, a detecting unit 16 and a sensing unit 14. The sensing unit 14 is replaceably disposed in the containing slot 100 of the main body 10. The processor unit 12 recognizes via the detecting unit 16 the sensing unit 14, thereby the processor unit 12 drives the sensing unit 14, so that the sensing unit 14 generates an input signal to the processor unit 12 according to movement of the main body 10. The processor unit 12 outputs a cursor control signal to a computer apparatus (not shown) according to the input signal.

Please refer to FIG. 1A continuously. The main body 10 has a containing slot 100 and a first electrical interface 102. The first electrical interface 102 is disposed in the containing slot 100. In practice, the capacity of the containing slot 100 is larger than the volume of the sensing unit 14, so the containing slot 100 can contain the sensing unit 14. Of course, the containing slot 100 may be, for example, a reception slot of a hollow cylindrical shape, a hollow triangular pillar shape, a hollow rectangular pillar shape or a hollow polygonal pillar shape. The type of the containing slot 100 is not limited in the present embodiment.

In addition, the jointing mode between the containing slot 100 and the sensing unit 14 may be fastening jointing, rotation jointing, slide-rail jointing or holding jointing etc. In the present embodiment, the containing slot 100 has a first connection portion 103, while the first connection portion 103 may be, for example, a magazine. The sensing unit 14 has a second connection portion 1411, while the second connection portion 1411 may be, for example, a hook slip or a bayonet. The types of the first connection portion 103 and the second connection portion 1411 are not limited in the present embodiment.

The first connection portion 103 and the second connection portion 1411 are connected by means of a fastening mode, thereby the sensing unit 14 is disposed in the containing slot 100 by means of a fastening jointing mode, as shown in FIG. 1A. The jointing mode between the containing slot 100 and the sensing unit 14 is not limited in the present embodiment. In addition, the main body 10 has a key 18 operated by a user. The key 18 is used to let the sensing unit 14 escape from the containing slot 100. The type of the key 18 is not limited in the present embodiment.

The first electrical interface 102 may be, for example, input points of electronic signals, pins of electronic signals, an electrical conducting piece or elastic pins. The type of the first electrical interface 102 is not limited in the present embodiment. The first electrical interface 102 may be disposed at any position of the inner wall of the containing slot 100. The position at which the first electrical interface 102 is disposed in the containing slot 100 is not limited in the present embodiment, and those skilled in the art may perform a design freely according to requirement.

The sensing unit 14 comprises a shell body 141, a sensing element 140 and a second electrical interface 142, wherein the sensing unit 14 is coupled to the first electrical interface 102 when the sensing unit 14 is disposed in the containing slot 100 of the main body 10. In practice, the shell body 141 may be, for example, a cylinder body, a triangular pillar body, a rectangular pillar body, a polygonal pillar body or an irregular body. Of course, the type of the shell body 141 may be designed according to the containing slot 100, or the type of the containing slot 100 may be designed according to the shell body 141 of the sensing unit 14. The type of the shell body 141 of the sensing unit 14 is not limited in the present embodiment, and those skilled in the art may perform a design freely according to requirement.

The sensing unit 14 has a sensing element 140. The sensing element 140 may be, for example, a yellow/red light sensing element, a blue light sensing element, an infrared sensing element, a laser sensing element or a mechanical sensing element. The sensing unit 14 generates based on the sensing element 140 an input signal corresponding to a moving amount of the main body 10, and the input signal determines the displacement of cursor. In other embodiments, the sensing unit 14 may also have two, three, or several sensing elements 140. For example, the sensing unit 14 has three sensing elements 140 such as a blue light sensing element, an infrared sensing element and a laser sensing element etc. Therefore, based on the blue light sensing element, the infrared sensing element and the laser sensing element, the sensing unit 14 generates an input signal corresponding to the moving amount of the main body 10.

In addition, the sensing unit 14 is a replaceable one-piece module and has a second electrical interface 142. When the second electrical interface 142 is coupled to the first electrical interface 102, the processor unit 12 gets via the first electrical interface 102 an input signal generated when the sensing unit 14 senses the movement of the main body 10, and then relatively outputs a cursor control signal to a computer apparatus (not shown). In practice, the second electrical interface 142 may be, for example, input points of electronic signals, pins of electronic signals, an electrical conducting piece or elastic pins. The type of the second electrical interface 142 is not limited in the present embodiment.

The sensing element 140 includes, for example, a light emitting diode, an optical lens and an image processor etc., wherein the light emitting diode may be, for example, a yellow/red light emitting diode, a blue light emitting diode, an infrared light emitting diode, or a laser light emitting diode. The light emitting diode is used for emitting with a constant frequency a light to a working surface on which the mouse 1 is placed. Generally, the working surface has a definite texture feature. After the incident light emitted by a light emitting diode, is reflected by the working surface, the light is inputted to an image processor after being focused by an optical lens, thereby the sensing unit 14 forms a voltage or a current signal according to the strength of the reflective light. The voltage or the current signal is transmitted to the processor unit 12 via the first and the second electrical interfaces 102, 142, thereby the processor unit 12 converts the voltage or the current signal to a digital signal. For example, the image on the working surface is digitized, and the processor unit 12 performs a calculation for the sampled image, thus the displacement of the mouse 1 is determined. The types of the sensing unit 14 and the sensing element 140 are not limited in the present embodiment.

The processor unit 12 is disposed in the main body 10 and coupled to the first electrical interface 102. In practice, the processor unit 12 may be, for example, a CPU or a microprocessor (MCU) etc., which is used for performing a signal computation and processing within the mouse 1. The type of the processor unit 12 is not limited in the present embodiment. The sensing unit 14 is coupled to the first electrical interface 102, the processor unit 12 drives said sensing unit 14, and the sensing unit 14 generates an input signal to the processor unit 12 according to movement of the main body 10, while the processor unit 12 outputs a cursor control signal to a computer apparatus (not shown) according to the input signal.

Next, the processor unit 12 determines whether the sensing unit 14 is placed into the containing slot 100 of the main body 10 and recognizes the category of the sensing unit 14 by means of the detecting unit 16. In practice, the detecting unit 16 is coupled between the processor unit 12 and the first electrical interface 102, and the detecting unit 16 detects the connection status between the second electrical interface 142 of the sensing unit 14 and the first electrical interface 102. The detecting unit 16 generates a detecting signal and transmits the detecting signal to the processor unit 12, so that the processor unit 12 can recognize the category of the sensing unit 14 according to the detecting signal.

The first electrical interface 102 includes a first recognition interface and a first data interface, and the second electrical interface 142 includes a second recognition interface and a second data interface. The first recognition interface has at least one first recognition contact point, the second recognition interface has at least one second recognition contact point, and the first recognition interface is coupled to the second recognition interface, the first data interface is coupled to the second data interface. The detecting unit 16 detects the coupling status between the first recognition contact point and the second recognition contact point, so as to output a detecting signal.

By way of example, the first recognition interface of the first electrical interface 102 has, for example, A, B, and C recognition contact points. The second recognition interface of the second electrical interface 142 has, for example, L, M, and N recognition contact points. When the second electrical interface 142 is coupled to the first electrical interface 102, the A recognition contact point corresponds to the position of the L recognition contact point, B recognition contact point corresponds to the position of the M recognition contact point, C recognition contact point corresponds to the position of the N recognition contact point.

Next, the second recognition interface of the blue light sensing element has, for example, L, M, N recognition contact points, the second recognition interface of the infrared sensing element has, for example, M, N recognition contact points, while the second recognition interface of the laser sensing element has, for example, L, N recognition contact points. When the detecting unit 16 detects that the A and C recognition contact points of the first electrical interface 102 are turned on, a laser sensing element can be recognized by the processor unit 12. As can be known similarly, when the detecting unit 16 detects that the B and C recognition contact points of the first electrical interface 102 are turned on, an infrared sensing element can be recognized by the processor unit 12.

In addition, the first recognition interface and the second recognition interface are coupled, the first data interface and the second data interface are coupled, while the processor unit 12 gets via the first electrical interface an input signal generated when the sensing unit 14 senses the movement of the main body 10. The input signal via the second data interface and the first data interface will be transmitted to the processor unit 12.

In other embodiments, the electrical interface may be one, two, or several recognition contact points, while the type of the sensing element 140 can be designed according to the recognition contact point of the electrical interface, and can be freely designed by those skilled in the art according to requirement. The types of the first electrical interface 102 and the second electrical interface 142 are not limited in the present embodiment.

In addition, the detecting unit 16 can be realized by means of a detector or a detecting circuit. In other embodiments, the detecting unit 16 can also detect the type of the sensing element 140, and transmits the detecting signal to the processor unit 12. For example, the sensing unit 14 has three sensing elements 140 such as a blue light sensing element, an infrared sensing element and a laser sensing element etc., while the detecting unit 16 detects the detecting signals of the three sensing elements 140, and provides the detecting signals to the processor unit 12. In addition, mouse 1 of the replaceable sensing unit can use a switching unit (not shown) to replace the detecting unit 16, while the switching unit (not shown) is realized by means of a switching circuit. The type of the detecting unit 16 is not limited in the present embodiment.

The processor unit 12 has several control means, which is used to drive the sensing unit 14 and receives the input signals of the sensing unit 14, so as to generate a cursor control signal of a pointing cursor movement. In practice, the control means can be realized by means of a control firmware. The processor unit 12 selects corresponding to the sensing unit 14 one of these control means, so as to drive the sensing unit 14 and receive an input signal.

By way of example, the processor unit 12 has three control means for controlling the blue light sensing element, the infrared sensing element and the laser sensing element. However, the sensing unit 14 is, for example, an infrared sensing element. When the sensing unit 14 is coupled to the first electrical interface 102, the processor unit 12 will select one of the control means, which controls the infrared sensing element, from the three control means. As can be known similarly, the sensing unit 14 may be, for example, a blue light sensing element, and the processor unit 12 will select one of the control means, which controls the blue light sensing element, from the three control means. The type of the control means is not limited in the present embodiment.

It is worth noting that the present invention further includes an adjustment element (not shown), which is disposed between a shell body 141 and a sensing element 140, thereby a user can adjust the position of the sensing element 140 disposed in the shell body 141. In practice, a user operates a mouse 1 on a working surface, wherein the LED of the sensing element 140 is disposed, relative to a height and an incident angle of the working surface, in the shell body 141. The height and the incident angle of the sensing element 140 relative to the working surface are adjusted by an adjustment element (not shown) in the present invention. The adjustment element (not shown) is realized, for example, by an adjustment gear or an adjustment slide-rail. Those skilled in the art can perform a free design according to requirement.

Next, the mouse 1 with a replaceable sensing unit further includes an output unit (not shown). The output unit (not shown) may be, for example, an RF transmitter used for receiving a cursor control signal transmitted by the processor unit 12 and transmitting the cursor control signal to a computer apparatus (not shown), wherein the cursor control signal facilitates the computer apparatus (not shown) to perform a corresponding instruction. In other embodiments, the output unit (not shown) may be a wired transmitter too. The type of the output unit (not shown) is not limited in the present embodiment.

As can be known here, in the present invention the mouse 1 with a replaceable sensing unit may replace a different sensing unit 14 according to a working surface, or switch a different sensing element 140, thereby the mouse 1 can be operated on various working surfaces, for example, a mouse pad surface of different pigment coating layers, a plastic surface or a woody surface, thus a cursor control signal suitable for movement of the working surface is generated by the mouse 1 and transmitted to a computer apparatus (not shown), so the operation convenience of the mouse 1 is enhanced. Furthermore, when the screen picture of the computer apparatus (not shown) is not a square, the mouse 1 of the sensing unit can be replaced or different sensing unit 14 can be replaced or different sensing element 140 can be switched, or in the present invention the height and the incident angle of the sensing element 140 relative to the working surface are adjusted by an adjustment element, so that the relative speeds of the pointing cursor in a transverse axis and a longitudinal axis of a screen picture are synchronous, thereby the operation convenience of the mouse 1 is enhanced.

Figure 2A:
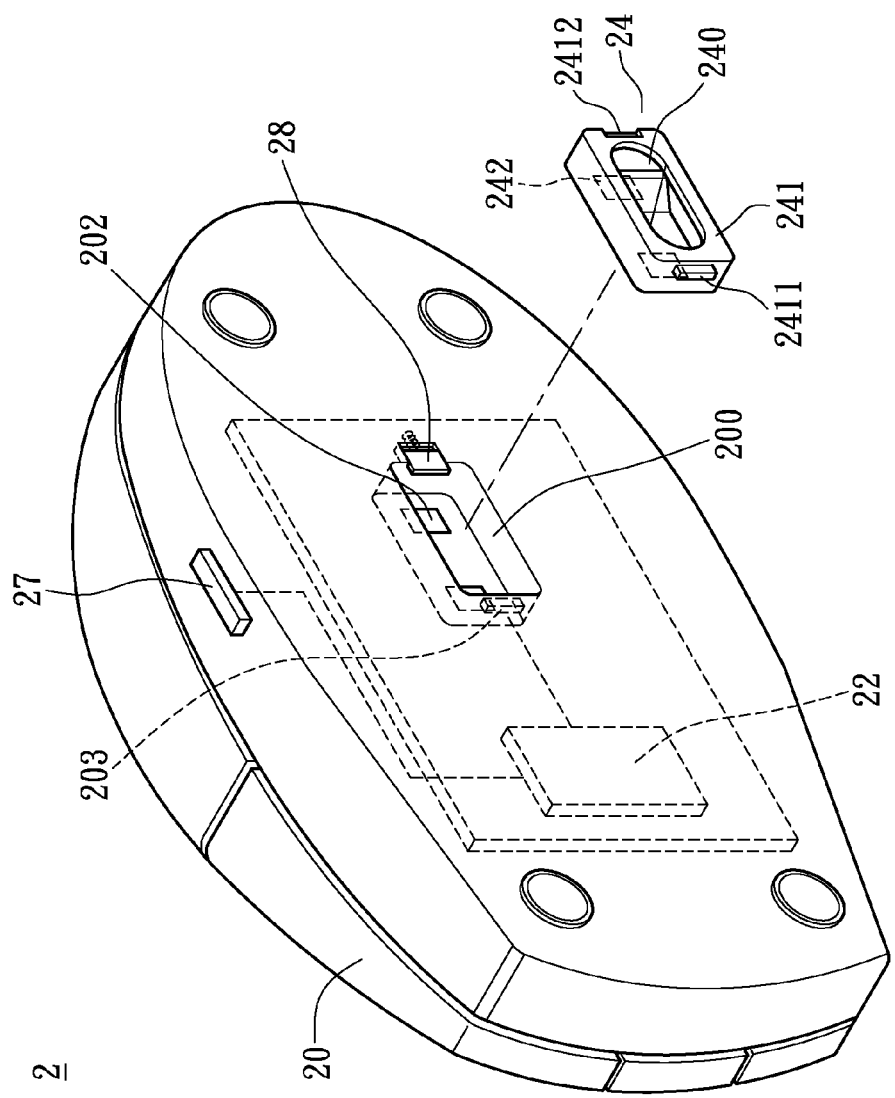
FIG. 2A shows a schematic diagram of a mouse with a replaceable sensing unit according to another embodiment of the present invention.
Figure 2B:
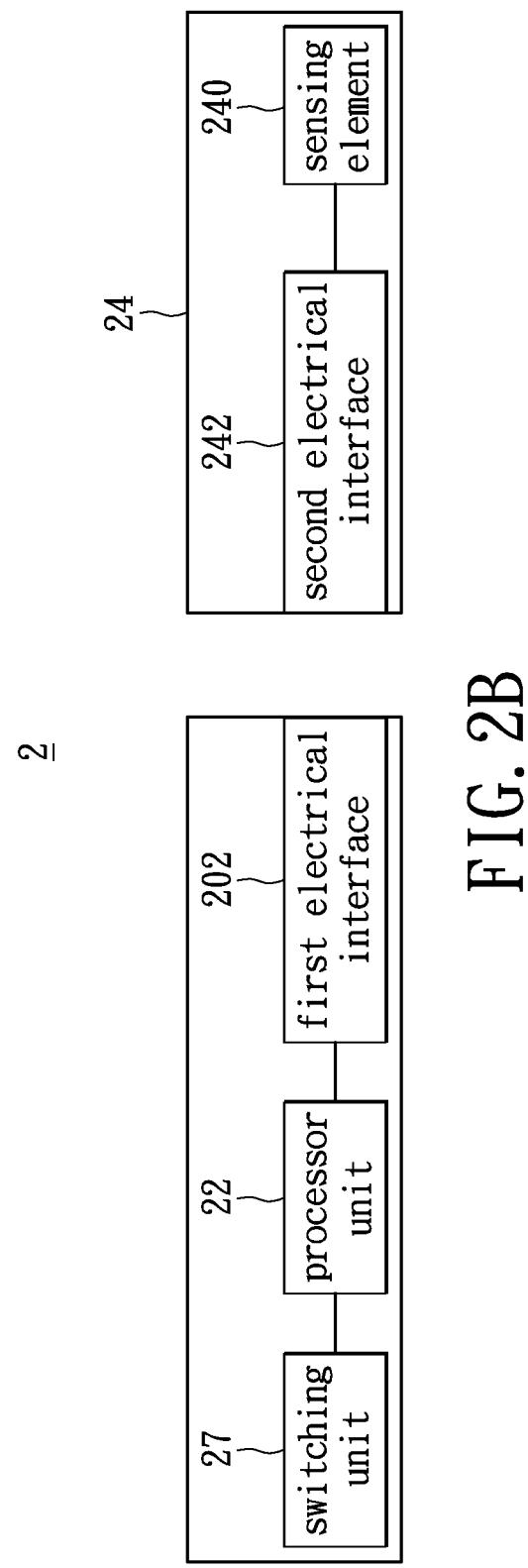
FIG. 2B shows a functional block diagram of a mouse with a replaceable sensing unit according to the embodiment of FIG. 2A in the present invention.

FIG. 2A shows a schematic diagram of a mouse with a replaceable sensing unit according to another embodiment of the present invention. FIG. 2B shows a functional block diagram of a mouse with a replaceable sensing unit according to the embodiment of FIG. 2A in the present invention. Please refer to FIG. 2A and FIG. 2B. The structure of the mouse 2 with a replaceable sensing unit in FIG. 2 is similar to that of the mouse 1 with a replaceable sensing unit in FIG. 1. The difference between the mice 2, 1 with a replaceable sensing unit consists in that the mouse 2 has a switching unit 27 that is coupled to the processor unit 22, and the switching unit 27 outputs a switching signal to the processor unit 22, so that the processor unit 22 can recognize the category of the sensing element 240 according to the switching signal.

The switching unit 27 can be realized by means of a switch or a switching circuit. The type of the switching unit 27 is not limited in the present embodiment. For example, the processor unit 22 has three control means used for controlling a blue light sensing element, an infrared sensing element and a laser sensing element. The sensing unit 24 has, for example, a blue light sensing element. When the sensing unit 24 is coupled to a first electrical interface 202, a user, for example, presses a switching unit 27, so as to let the switching unit 27 switch to a mode of a blue light sensing element. The switching unit 27 outputs a switching signal of the blue light sensing element to the processor unit 22, so that the processor unit 22 can recognize the category of the sensing element 240 according to the switching signal.

By way of example, the processor unit 22 can recognize the category of the sensing element 240 according to the switching signal, so as to switch one of the three control means. For example, a user lets the switching unit 27 switch to a mode of an infrared sensing element, thus the processor unit 22 can recognize the category of the sensing element 240 according to the switching signal, so as to be switched to a control means for controlling the infrared sensing element; when the user lets the switching unit 27 switch to a mode of a laser sensing element, the processor unit 22 can recognize the category of the sensing element 240 according to the switching signal, so as to be switched to a control means for controlling the laser sensing element.

In other embodiments, the switching unit 27 can be realized by means of a switching circuit. For example, after a user presses the input unit (not shown) of a mouse 2 for a definite time, and a switching signal is outputted to the processor unit 22 via a switching circuit, then the processor unit 22 can recognize the category of the sensing element 240 according to the switching signal. For example, a user continuously presses the left key of a mouse for 6 seconds, the mouse 2 outputs a switching signal to the processor unit 22 via a switching circuit, so as to let the processor unit 22 recognize the category of the sensing element 240 according to the switching signal. The type of the switching unit 27 is not limited in the present embodiment.

It is worth mentioning that the front side of the shell body 241 of the sensing unit 24 has a second connection portion 2411, which may be a fastening element. While the rear side of the shell body 241 has a recess portion 2412, the containing slot 200 is provided with a first connection portion 203 which is corresponding to the second connection portion 2411 of the shell body 241. The first connection portion 203 may be a magazine. The containing slot 200 is provided with a locking/unlocking element 28 which is corresponding to the recess portion 2412 of the shell body 241, as shown in FIG. 2.

In addition to the above difference, those skilled in the art should easily infer other differences by referring to the above embodiments and difference, therefore the description thereof is omitted here.

Figure 3:
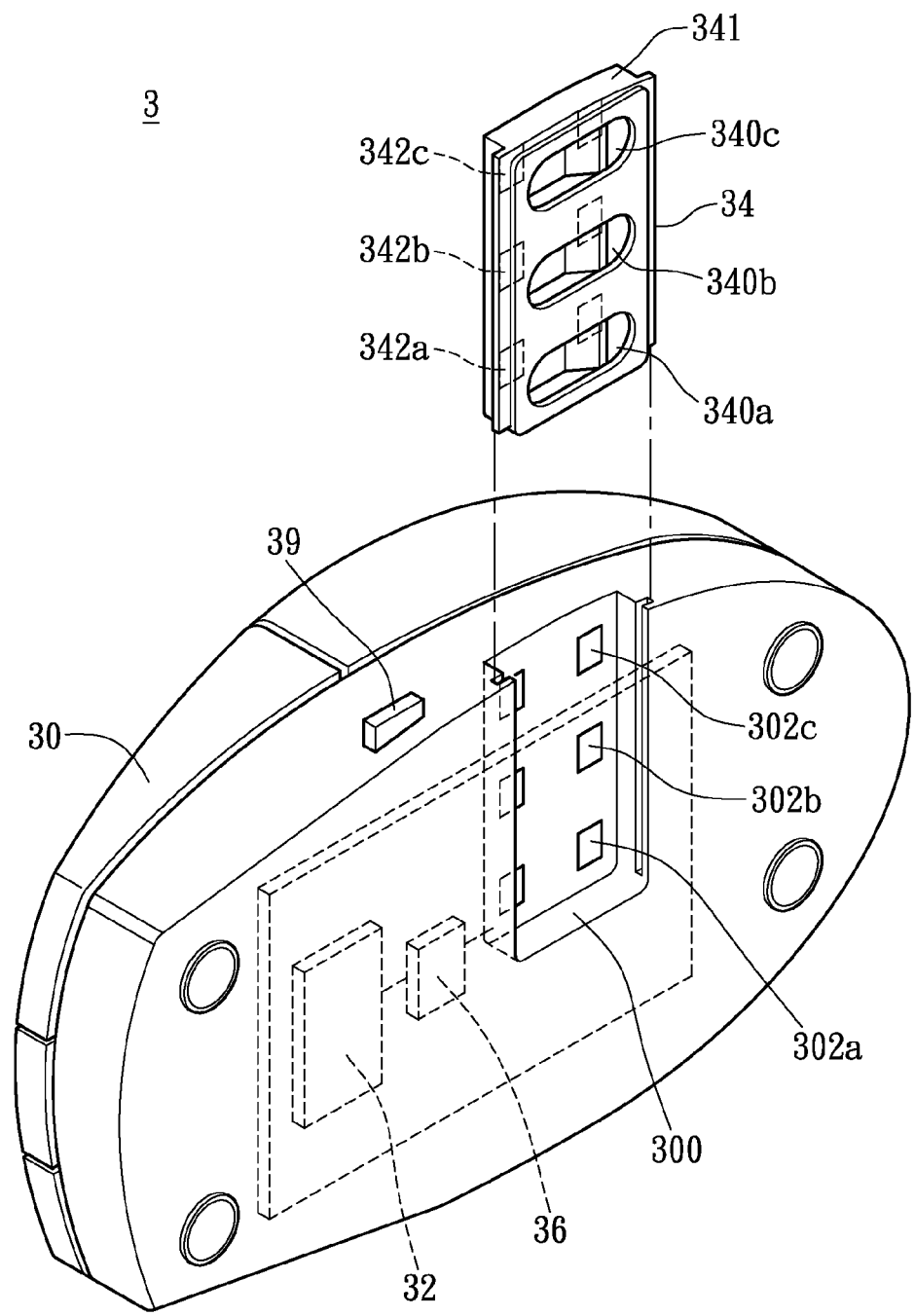
FIG. 3 shows a schematic diagram of a mouse with a replaceable sensing unit according to another embodiment of the present invention.

FIG. 3 shows a schematic diagram of a mouse with a replaceable sensing unit according to another embodiment of the present invention. Please refer to FIG. 3. The mouse 3 with a replaceable sensing unit according to the present embodiment is similar to the mouse 1 with a replaceable sensing unit according to the previous embodiment. For example, in the mouse 3 with a replaceable sensing unit the sensing unit 34 may be replaced too. However, a difference still exists between the mice 3, 1 with a replaceable sensing unit and the difference consists in that the amount of the sensing elements 340 of the sensing unit 34 is three. When the amount of the sensing elements 340 is larger than 2, the processor unit 22 can switch one of those control means by means of a setting unit 39, so as to drive one of those corresponding sensing elements 340 to operate and receive the input signal of the sensing unit 34. The amount and types of the sensing elements 340 are not limited in the present embodiment.

Mouse 3 includes a main body 30, a processor unit 32, a sensing unit 34, a detecting unit 36 and a setting unit 39. The main body 30 has a containing slot 300 and several first electrical interfaces 302a, 302b, 302c, said first electrical interfaces 302a, 302b, 302c are disposed in the containing slot 300.

The processor unit 32 is disposed in the main body 30 and coupled to said first electrical interfaces 302a, 302b, 302c. The sensing unit 34 is replaceably disposed in the containing slot 300 of the main body 30. The sensing unit 34 has several sensing elements 340a, 340b, 340c and several second electrical interfaces 342a, 342b, 342c. Each sensing element 340a, 340b, 340c is respectively connected with a second electrical interface 342a, 342b, 342c. When the sensing unit 34 is disposed in a containing slot 300, each of the first electrical interfaces 302a, 302b, 302c is respectively connected with a second electrical interface 342a, 342b, 342c.

The detecting unit 36 is coupled between said first electrical interfaces 302a, 302b, 302c and the processor unit 32. The detecting unit 36 detects the connection status between the first electrical interfaces 302a, 302b, 302c and said second electrical interface 342a, 342b, 342c, and outputs a detecting signal to the processor unit 32, so that the processor unit 32 can recognize the category of the sensing elements 340a, 340b, 340c according to the detecting signal.

For example, when the second electrical interfaces 342a, 342b, 342c of the sensing unit 34 are coupled with the first electrical interfaces 302a, 302b, 302c, the processor unit 32 recognizes a blue light sensing element 340a, an infrared sensing element 340b and a laser sensing element 340c of the sensing unit 34. The type of the detecting unit 36 is not limited in the present embodiment.

The setting unit 39 is coupled to the processor unit 32 and sets one of the first electrical interfaces 302a, 302b, 302c to perform a signal transmission with the processor unit 32. The processor unit 32 gets via the first electrical interfaces 302a, 302b, 302c an input signal generated when the sensing elements 340a, 340b, 340c of the sensing unit 34 sense the movement of the main body 30 according to setting result of the setting unit 39, and relatively outputs a cursor control signal to a computer apparatus (not shown).

By way of example, the sensing unit 34 has three sensing elements such as a blue light sensing element 340a, an infrared sensing element 340b and a laser sensing element 340c. While the initial setting control means of the processor unit 32 may be, for example, a control means for controlling the blue light sensing element 340a, the processor unit 32 can switch one of three control means according to the setting unit 39. For example, a user presses the setting unit 39 at first time, so as to switch to a control means for controlling the infrared sensing element 340b, thereby the processor unit 32 drives the infrared sensing element 340b via the first and the second electrical interfaces 302b, 342b. The infrared sensing element 340b senses an input signal generated when the main body 30 moves, and relatively outputs a cursor control signal to a computer apparatus (not shown).

When a user presses the setting unit 39 at second time, so as to switch to a control means for controlling the laser sensing element 340c, thus the processor unit 32 drives the laser sensing element 340c via the first and the second electrical interfaces 302c, 342c. The laser sensing element 340c senses an input signal generated when the main body 30 moves, and relatively outputs a cursor control signal to a computer apparatus (not shown).

When a user presses the setting unit 39 at third time, so as to switch to a control means for controlling the blue light sensing element 340a, thus the processor unit 32 drives the blue light sensing element 340a via the first and the second electrical interfaces 302a, 342a. The blue light sensing element 340a senses an input signal generated when the main body 30 moves, and relatively outputs a cursor control signal to a computer apparatus (not shown).

In addition, the setting unit 39 may be realized by means of a setting circuit. For example, after a user presses the input unit (not shown) of a mouse 3 for a definite time, by a control means of a switching circuit for switching and controlling the sensing element 340a, 340b and 340c, wherein the input unit (not shown) may be a left key of a mouse, a right key of a mouse or a mouser roller. For example, a user may presses the right key of a mouse for 5 seconds, so as to switch the control means of the sensing element 340a, 340b and 340c. The type of the setting unit 39 is not limited in the present embodiment.

Next, the side of the main body 30 of the mouse 3 has a containing slot 300, thereby the sensing unit 34 may be placed into the containing slot 300 from the side of the main body 30, as shown in FIG. 3. In previous embodiments, the containing slot 300 is disposed at the bottom surface of the main body 30 of the mouse 3. Therefore, the sensing unit 34 may be placed into the containing slot 300 from the bottom surface of the main body 30. In the present embodiment, the containing slot 300 is disposed at the side of the main body 30, and the containing slot 300 has a pair of slide-slot structure. Of course, the sensing unit 34 is provided with a slide-rail structure according to the slide-slot structure, thereby the sensing unit 34 may be placed into the containing slot 300. In other embodiments, the containing slot 300 can be disposed at any position of the main body 30 of the mouse 3. Those skilled in the art may perform a free design according to requirement.

In addition, a user may let the first electrical interface 302 of the containing slot 300 be separated from the second electrical interface 342 of the sensing unit 34 by means of a slide-rail. When a user does not operate a mouse 3 or the mouse 3 is raised to perform a transposition, the user may pull the sensing unit 34 out from the main body 30, so as to reduce the opportunity of abnormal movement of a pointing cursor. In other embodiments, one side or two sides of the shell body 341 may be provided with a slide-rail structure. Alternatively, one side or two sides of the shell body 341 may be provided with a slide-slot structure. Of course, the containing slot 300 is provided with a corresponding slide-rail structure or slide-slot structure according to the shell body 341. The types of the shell body 341 and the containing slot 300 of the sensing unit 34 are not limited in the present embodiment.

In addition to the above difference, those skilled in the art should easily infer other differences by referring to the above embodiments and difference, therefore the description thereof is omitted here.

Figure 4:
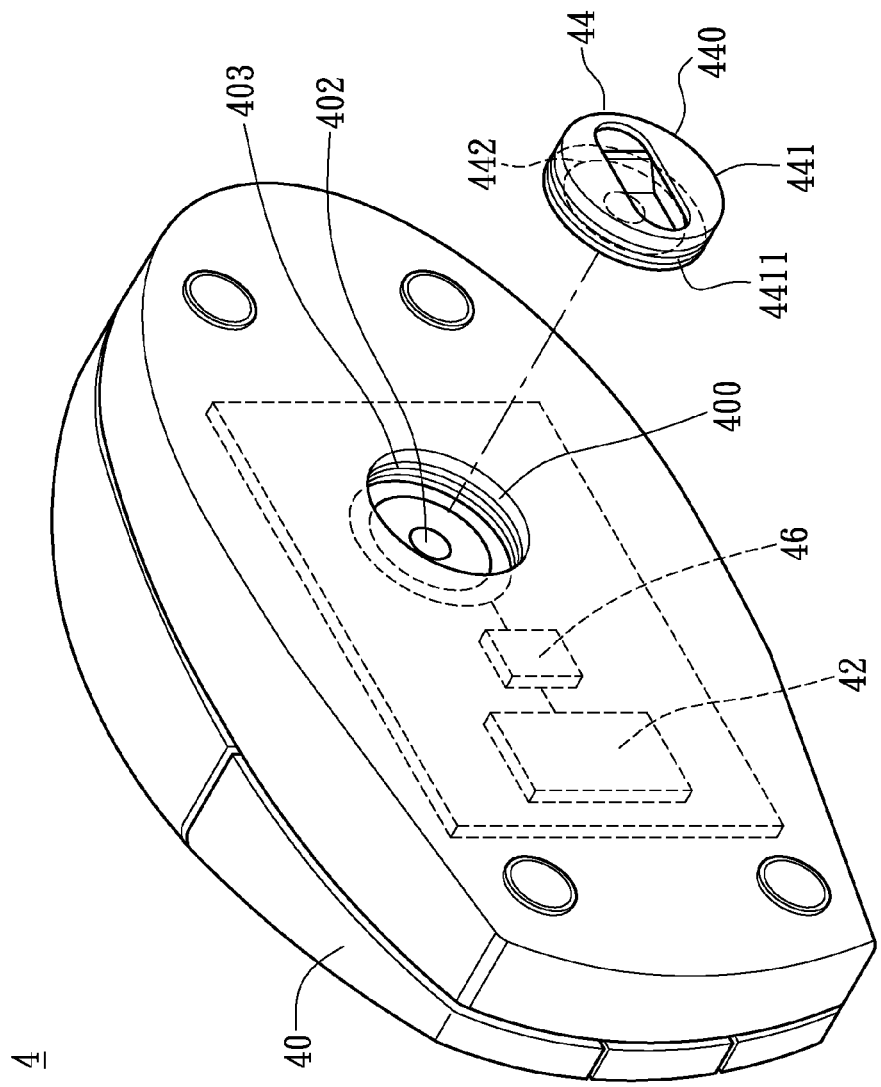
FIG. 4 shows a schematic diagram of a mouse with a replaceable sensing unit according to another embodiment of the present invention.

FIG. 4 shows a schematic diagram of a mouse with a replaceable sensing unit according to another embodiment of the present invention. Please refer to FIG. 4. The structure of the mouse 4 with a replaceable sensing unit in FIG. 4 is similar to that of the mouse 1 with a replaceable sensing unit in FIG. 1. The difference of the mice 4, 1 with a replaceable sensing unit consists in that the shell body 441 of the sensing unit 44 is, for example, a cylinder, wherein the shell body 441 has a second connection portion 4411. Of course, the containing slot 400 also has a corresponding first connection portion 403, wherein the first and the second connection portions 403, 4411 are, for example, thread structures, thereby the sensing unit 44 is placed into the containing slot 400 by means of a rotation joint mode.

The sensing unit 44 is placed into the containing slot 400 by means of a rotation joint mode, wherein the second electrical interface 442 of the sensing unit 44 is, for example, a circular electronic signal input point or an electrical conducting piece of circular ring shape. The sensing unit 44 rotates upwards from the bottom surface of the main body 40, so that the second electrical interface 442 rotates upwards to contact the first electrical interface 402 of the main body 40, while the first electrical interface 402 is, for example, an elastic pin, thereby the sensing unit 44 is fixed in the containing slot 400 by means of the thread structure, so that the first and the second electrical interfaces 402, 442 are coupled mutually. In addition, the control means of the processor unit 42 can drive the sensing unit 44 and receives the input signal of the sensing unit 44.

Furthermore, a user may let the first electrical interface 402 of the containing slot 400 and the second electrical interface 442 of the sensing unit 44 be separated by means of rotation. When a user does not operate a mouse 4 or the mouse 4 is raised to perform a transposition, the user can rotate the sensing unit 44, thus the sensing unit 44 escapes from the containing slot 400 of the main body 40, so as to reduce the opportunity of abnormal movement of a pointing cursor.

In other embodiments, whole surface or partial surface of the shell body 441 can be provided with a thread structure, while the thread structure can be a male thread structure or a female thread structure. Of course, the containing slot 400 is provided with a corresponding thread structure according to the sensing unit 44. The types of the shell body 441 and the containing slot 400 of the sensing unit 44 are not limited in the present embodiment.

In addition to the above difference, those skilled in the art should easily infer other differences by referring to the above embodiments and difference, therefore the description thereof is omitted here.

Summing up the above, the mouse with a replaceable sensing unit in the present invention can replace different sensing unit or switch a different sensing element according to a working surface, or in the present invention the height and the incident angle of the sensing element relative to the working surface is adjusted by means of an adjustment element, thus the convenience when the mouse is operated on various working surfaces is enhanced. Next, when a user raises the mouse to perform a transposition, the mouse with a replaceable sensing unit in the present invention may let the sensing unit be separated from the first electrical interface, so as to reduce the opportunity of abnormal movement of a pointing cursor. Furthermore, when the screen picture of the computer apparatus is not a square, the mouse with a replaceable sensing unit in the present invention may also let the relative speeds of the pointing cursor in a transverse axis and a longitudinal axis of a screen picture be synchronous, thereby the operation convenience of the mouse is enhanced.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A mouse, comprising:
a main body, having a containing slot and a first electrical interface, the first electrical interface being disposed in the containing slot;
a processor unit, disposed in the main body and coupled to the first electrical interface; and
a sensing unit, disposed replaceably in the containing slot of the main body, and coupled to the first electrical interface when the sensing unit is disposed in the containing slot;
wherein the processor unit gets via the first electrical interface an input signal generated when the sensing unit senses the movement of the main body, and then relatively outputs a cursor control signal to a computer apparatus.

2. The mouse according to claim 1, wherein the sensing unit has a shell body, a second electrical interface and a sensing element.

3. The mouse according to claim 2, wherein the sensing element is a yellow/red light sensing element, a blue light sensing element, an infrared sensing element, a laser sensing element or a mechanical sensing element.

4. The mouse according to claim 2, further comprising:
a detecting unit, coupled between the first electrical interface and the processor unit, and the detecting unit detecting the connection status between the first electrical interface and the second electrical interface, and outputting a detecting signal to the processor unit, so that the processor unit can recognize the category of the sensing unit according to the detecting signal.

5. The mouse according to claim 4, wherein the first electrical interface includes a first recognition interface and a first data interface, the second electrical interface includes a second recognition interface and a second data interface, the first recognition interface has at least one first recognition contact point, and the second recognition interface has at least one second recognition contact point, wherein the first recognition interface is coupled to the second recognition interface, the first data interface is coupled to the second data interface, and the detecting unit detects the coupling status between the first recognition contact point and the second recognition contact point so as to output the detecting signal.

6. The mouse according to claim 1, further comprising:
a switching unit, coupled to the processor unit, and the switching unit outputting a switching signal to the processor unit, so that the processor unit can recognize the category of the sensing element according to the switching signal.

7. The mouse according to claim 1, wherein the containing slot has a first connection portion, and the sensing unit has a second connection portion, wherein the first connection portion and the second connection portion are connected by means of fastening, rotation, slide-rail or holding.

8. A mouse, comprising:
a main body, having a containing slot and several first electrical interfaces, the several first electrical interfaces being disposed in the containing slot;
a processor unit, disposed in the main body and coupled to the several first electrical interfaces; and
a sensing unit, disposed replaceably in the containing slot of the main body, the sensing unit having several sensing elements and several second electrical interfaces, and each sensing element is respectively connected to a second electrical interface, wherein each first electrical interface is respectively connected to a second electrical interface when the sensing unit is disposed in the containing slot; and
a setting unit, coupled to the processor unit and setting one of said several first electrical interfaces to perform signal transmission with the processor unit;
wherein according to the setting result of the setting unit, the processor unit gets correspondingly via the set first electrical interface an input signal generated when the sensing element of the sensing unit senses the movement of the main body, and then relatively outputs a cursor control signal to a computer apparatus.

9. The mouse according to claim 8, wherein the sensing element is a yellow/red light sensing element, a blue light sensing element, an infrared sensing element, a laser sensing element or a mechanical sensing element.

10. The mouse according to claim 8, wherein the containing slot has a first connection portion, and the sensing unit has a second connection portion, wherein the first connection portion and the second connection portion are connected by means of fastening, rotation, slide-rail or holding.

11. The mouse according to claim 8, further comprising:
a detecting unit, coupled between the several first electrical interfaces and the processor unit, and the detecting unit detecting the connection status between the several first electrical interfaces and the several second electrical interfaces, and outputting a detecting signal to the processor unit, so that the processor unit can recognize the category of the several sensing elements according to the detecting signal.

* * * * *